Nov. 16, 1954    F. W. HERMS    2,694,397
MOUTH PROP
Filed Sept. 15, 1952
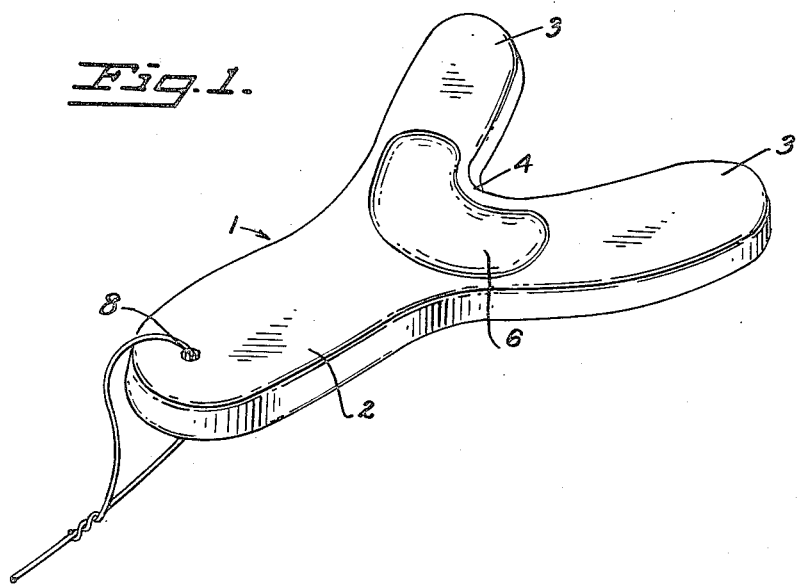
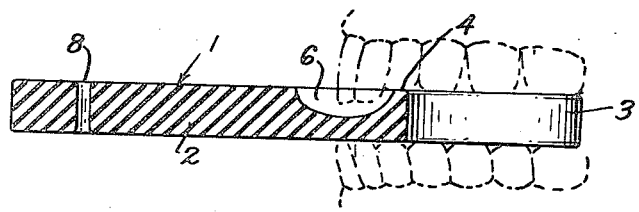
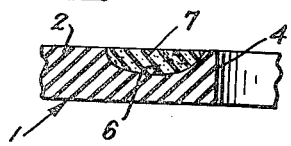
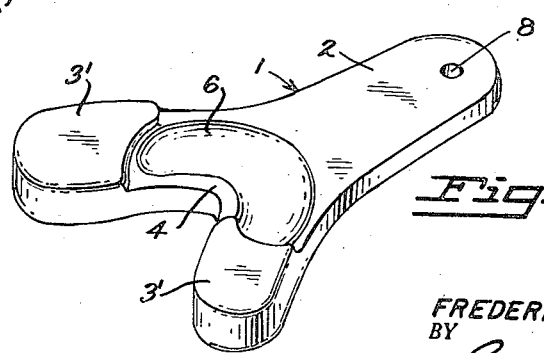
INVENTOR.
FREDERICK W. HERMS
BY
George B. White
ATTORNEY

United States Patent Office 2,694,397
Patented Nov. 16, 1954

2,694,397
MOUTH PROP

Frederick W. Herms, Imola, Calif.

Application September 15, 1952, Serial No. 309,620

4 Claims. (Cl. 128—136)

This invention relates to a mouth prop for shock therapy.

The primary object of this invention is to provide a device which will positively prevent injuries to, and loss of, upper and lower anterior teeth during the process of administering electric shock therapy.

The upper and lower incisor and cuspid teeth, when in normal occlusion and articulation, overlap each other, the upper overlapping the lowers, similar to the closure of a pair of shears. The transverse diameters of these teeth are very much less than that of the posterior teeth and in addition, being single rooted, they are more fragile with a greater susceptibility to fracture and dislodgment as a resultant of the application of sudden and unusual lateral forces and stresses.

During the initial heavy and spasmotic closure of the jaws, upon the application of shock therapy, any object used as a mouth prop which becomes impinged upon and between the anterior teeth would, because of the nature of their occlusion as referred to above, exert a sudden and unusual heavy pressure and force anteriorly and posteriorly against the thinnest and frailest part of the osseous coverings of the roots of these teeth, which often results in a fracture of these thin bony plates as well as either the fracture or complete exfoliation of these incisor teeth.

Features of this invention are: the provision of resilient pads posteriorly on a prop to take up the shock of sudden and heavy closure upon the occlusal surfaces of the molar and bicuspid teeth; and the provision of suitable spacing between the anterior teeth which prevents impingement between the incisor teeth and obviates the application of any undue strain upon said incisor teeth.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view which will be made manifest in the following detailed description, reference is had to the accompanying drawings for the illustrative embodiment of the invention, wherein:

Fig. 1 is a perspective view of my mouth prop.

Fig. 2 is a sectional view of my mouth prop, showing the relative position of the teeth closed thereon.

Fig. 3 is a fragmental, sectional view of a modified form of my mouth prop, and

Fig. 4 is a perspective view of another modified form of my mouth prop.

In carrying out my invention I make use of a resilient, preferably hard rubber generally Y shaped body 1. A handle 2 is formed by the leg of said Y shape, and the forked branches thereof form pads 3 insertable between the teeth in the mouth.

The joint 4 where the handle 2 and the pads 3 join forms part of an arc in continuation of the curved branches or pads 3 conforming to the average curvature of the row of teeth in the mouth so that the branches or pads 3 and said joint 4 can be placed between said teeth and prevent direct contact between the upper and lower teeth.

In the joint 4 between the pads 3 is provided a recess 6 preferably on one face of the prop body 1. This recess 6 is generally arcuate and of sufficient length to accommodate the anterior or incisor teeth therein. The pads 3 are of such thickness as to space the posterior teeth apart so as to prevent contact between the lower and upper anterior teeth or any firm pressure engagement of these anterior teeth with the prop body 1 at said recess 6. The recess 6 also serves as a guide in the proper placement of the mouth prop between the teeth.

In the modified form shown in Fig. 3 the recess 6 is filled with a soft resilient filler 7, for instance of sponge rubber, which yields easily and does not exert any appreciable pressure on the anterior teeth closed thereon.

In the form shown in Fig. 4 the pads 3' are made considerably thicker than the rest of the prop body, so as to protrude above the level of the top of the recess 6. This form is particularly adapted to cases where the posterior teeth are missing and only the upper and lower anterior teeth are present. The pads 3' of this form are thick enough to be contacted by the alveolar ridges upon closure and maintain space enough between the anterior teeth so as to prevent their contact and obviate the application of any sudden force or stress upon said anterior teeth.

In practice the mouth prop is held by its handle 2, which has a hole 8 in it for attaching a suitable cord or line. The line or cord facilitates the placing of a used prop into a sterilizing solution without the necessity of handling the prop itself. It also acts as a safeguard for the prompt and easy removal of a prop which may have become displaced in such a manner as to block the larynx and thereby interfere with the respiration. The arcuate forked portion of the prop is quickly inserted in the mouth of the patient and is easily located between the teeth so that anterior or incisor teeth are opposite the recess 6. The pads 3 take up the shock of sudden heavy closure upon the occlusal surfaces of the molar and bicuspid teeth during shock therapy. Heavy vertical stresses thus applied to these posterior teeth produce no injuries. The anterior teeth are spaced at the recess 6 without any force applied thereto. The device is simple and unitary in construction, it does not require any adjustment and it is eminently adapted for protection against injury to teeth or bone structure during shock therapy.

I claim:

1. In a mouth prop of the character described a spacing member, spaced pads on the spacing member generally opposite to the position of the posterior teeth of the user and a soft resiliently yieldable member in said spacing member between said pads generally opposite to the anterior teeth of the user.

2. In a mouth prop of the character described a spacing member, spaced pads on the spacing member opposite to the position of the posterior teeth of the user, said pads protruding beyond the respective surfaces of said spacing member.

3. In a mouth prop of the character described a spacing member, spaced pads on the spacing member opposite to the position of the posterior teeth of the user, said spacing member having a recess between said pads generally opposite to the anterior teeth of the user to prevent forcible contact of said anterior teeth with said member, said pads protruding above the level of said recess.

4. In a mouth prop of the character described a spacing member, spaced pads on the spacing member opposite to the position of the posterior teeth of the user and a soft resiliently yieldable member in said spacing member between said pads generally opposite to the anterior teeth of the user, said pads protruding above the level of said yieldable member.

References Cited in the file of this patent

UNITED STATES PATENTS

| Number | Name | Date |
|---|---|---|
| 2,521,084 | Oberto | Sept. 5, 1950 |
| 2,614,560 | Lee | Oct. 21, 1952 |